May 31, 1949.  D. W. BROOKFIELD  2,472,040

TOOLHOLDER

Filed Dec. 5, 1946

INVENTOR.
Donald W. Brookfield
BY Robert J. Palmer
Attorney

Patented May 31, 1949

2,472,040

UNITED STATES PATENT OFFICE 2,472,040

TOOLHOLDER

Donald W. Brookfield, Sharon, Mass., assignor to Brookfield Engineering Laboratories, Incorporated, Sharon, Mass.

Application December 5, 1946, Serial No. 714,321

6 Claims. (Cl. 29—96)

This invention relates to tool holders for the tools of such machines as latches, hand screw machines, automatic screw machines and the like.

Machines such as those referred to in the foregoing, are ordinarily provided in what are known as their tail stocks, with holes and internal clamping devices for holding uniformly sized tools in place. In order to adapt such machines for the use of various sized tools it is necessary to use an adaptor. Adaptors that have been used for such duties are known as three jawed universal chucking devices, tool holders, and floating tool holders.

A satisfactory adaptor must satisfy the following conditions: For such tools as drills, reamers, counterbores and supporting tools, their axes should coincide as nearly as possible with the axis of the spindle of the machine in which they are to be used. Their axes should be as parallel to the center line of the machine as is possible. They should be held with sufficient force as to prevent rotation and movement. The adaptor should be simple and easily adjusted. It should be universally adaptable to a wide range of different sized and shaped tools.

The conventional chucking devices will satisfy certain of these conditions in that they are adaptable to receive a wide range of tools, but they have the great disadvantage that there is no simple means of adjusting the holder after a tool is inserted, to bring the center line of the tool into sufficiently close relationship with the spindle axis. The adaptors known as tool holders have this same disadvantage, and have the additional disadvantage that they are not as widely applicable as the chucking devices.

The most commonly used adaptor is the floating tool holder which has a member that is placed in the tail stock or turret of a machine and which has a flat surface perpendicular to the axis of the spindle of the machine and which is clamped to a flat surface of a second member by screws which extend through loose fitting holes which permit movement between the flat surfaces and which permit a bushing receiving hole in the second member to be arranged substantially concentric with the axis of the spindle. In the bushing receiving hole in the second member are placed bushings which are drilled out to take the various sized tools. There is a separate bushing for each size of tool, and a set screw is provided for clamping the bushing and the tool to the second member. The tool is roughly centered and then brought to the spindle and caused to find its own center through the movement between the flat surfaces following which they are clamped together. Such floating tool holders have the disadvantages that they are not universally adaptable, and a bushing must be provided for every tool except those which actually fit the holes in the holders. The bushings, especially for small sized tools, are difficult to machine to exact alignment and such machining is costly. Frequently the bushings are spoiled and have to be discarded. A supply of different sized bushings has to be maintained.

This invention provides a tool holder having all of the advantages of the prior tool holders with none of their disadvantages. With it any size tool within a wide range can be quickly and tightly clamped in exact parallelism. It has the feature that a tool held in it is self centering through movement in directions perpendicular to each other when the tool is brought to the spindle of the machine in which it is used. It has the additional feature that it is self contained requiring no bushings.

The invention will now be described with reference to the drawing, of which:

Figure 1:
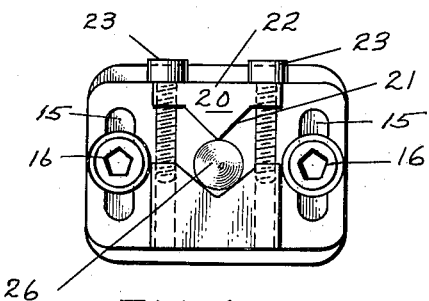
Fig. 1 is an end elevation of a tool holder embodying this invention with a small tool held therein.

The tool holder illustrated, consists of the body member 10 having the cylindrical extension or shank 11 which is adapted to be placed in the usual tool receiving hole in the tail stock or turret of a machine, and having the flat surface 12 perpendicular to the axis of the extension 11.

The tool receiving member 13 has a flat surface 14 in slidable contact, when the holder is assembled and not tightly clamped onto a tool, with the flat surface 12 of the body member 10.

Figure 5:
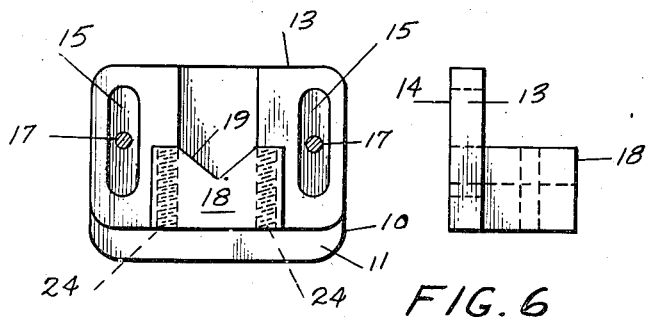
Fig. 5 is an end elevation of the tool receiving member against the holder body, and illustrates the loose fit of the screws in slots in the tool receiving member.
Figure 6:
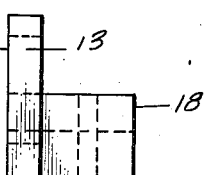
Fig. 6 is a side elevation of the tool receiving member of the holder.
Figure 7:
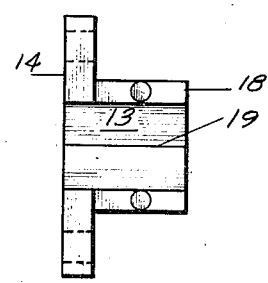
Fig. 7 is a plan view looking downwardly upon Fig. 6.

The member 13 has the slots 15 through which the machine screws 16 extend, the screws 16 being threaded into holes in the body member 10, and having the portions 17 (Fig. 5) of reduced diameter within the slots 15. The washers 25 extend around the screws 16 between their heads and the outer surface of the member 13.

The member 13 also has the shoulder portion 18 with the V-shaped recess therein, the apex of the V being midway between the center lines of the slots 15.

The tool clamping plate 20 has a V-shaped surface 21 formed complemental to the V-shaped recess 19, and has opposite thereto the flat surface 22. The plate 20 has openings therethrough through which extend the machine screws 23 which are threaded into the topped openings 24 in the shoulder portion 18.

The slots 15 along their lengths, provide adjustment of the member 13 in a vertical direction with reference to Fig. 1, relative the member 10, for adjusting the holder to receive different sizes of tools and for alignment of the tools in a vertical direction, and across their widths, together with the loose fitting screw portions 17 (Fig. 5), provide horizontal movement of the member 13 relative the member 10 for alignment of the tool in a horizontal direction.

Figure 2:
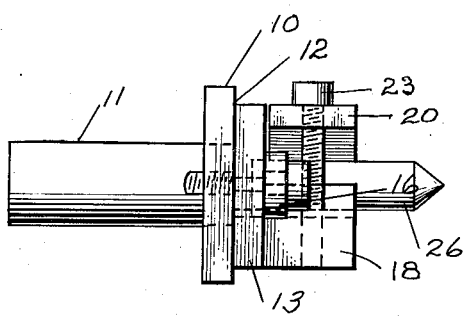
Fig. 2 is a side elevation of the holder.
Figure 4:
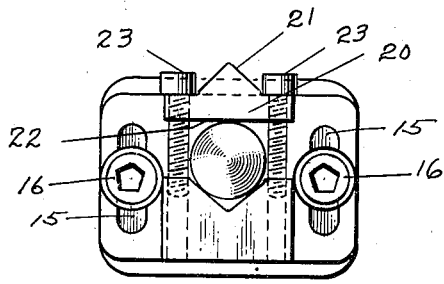
Fig. 4 is an end elevation similar to Fig. 1 but with the tool clamping plate inverted for holding a larger tool.
Figure 3:
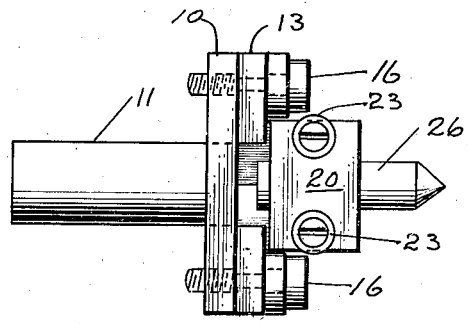
Fig. 3 is a plan view looking downwardly upon the holder.

In using the holder, a tool 26 is inserted in the V-shaped recess 19 and clamped therein by the tightening of the screws 23 down against the plate 20. If the tool is a small one the plate 20 is arranged as illustrated by Figs. 1–3, with the apex of its V-shaped surface 21 touching the tool. If the tool is a large one the plate 20 is arranged as illustrated by Fig. 4, with its flat surface 22 touching the tool.

The tool is then roughly centered by sliding the flat surface 14 of the member 18 vertically and horizontally with reference to Fig. 1, against the flat surface 11 of the member 10, until the axis of the tool 26 is in approximate alignment with the axis of the spindle of the machine following which the tool is brought against the spindle and centers itself by movement in the two described directions, with its axis in exact alignment with the axis of the spindle. The screws 16 are then tightened for clamping the assembly against movement.

Figure 8:
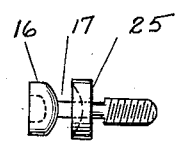
Fig. 8 is a side elevation of one of the holder clamping screws with a washer thereon.

As illustrated by Fig. 8, the inner surfaces of the heads of the screws 16 have spherical curvature, the cooperating adjacent surfaces of the washers 25 being formed complemental thereto. With this construction, the screws 16 can be tightened without throwing the members 17 and 10 out of alignment.

Another advantage of the tool holder of this invention is that it can be used for holding tool bits, etc., off center in boring operations as for use in milling machines and drill presses.

While one embodiment of the invention has been described for the purpose of illustration, it should be understood that the invention is not limited to the exact design illustrated, as modifications thereof may be suggested by those skilled in the art without departure from the essence of the invention.

What is claimed is:

1. A tool holder comprising a body member having a shank and having an inner face perpendicular to the axis of the shank, a tool clamping member having an inner face parallel to said face, in contact therewith and slidable in transverse directions thereon, means for clamping said members together, said clamping member having a shoulder portion with a substantially V-shaped recess therein, said recess having sides extending in planes substantially parallel to said axis and tool clamping means extending into said recess.

2. A tool holder comprising a body member having a shank and having an inner face perpendicular to the axis of the shank, a tool clamping member having an inner face parallel to said face and in contact therewith, said clamping member having a shoulder portion with a substantially V-shaped recess therein, the apex of the V being in alignment with the said axis, said clamping member having slots therein on opposite sides of said recess, cylindrical clamping members extending through said slots and into said body member for clamping said tool clamping member thereto, said cylindrical members having diameters within said slots less than the width thereof, and tool clamping means extending into said recess.

3. A tool holder as claimed in claim 2 in which said cylindrical members have heads with curved inner surfaces, and washers extend around the cylindrical members between the heads thereof and the tool clamping member, the washers having recesses therein formed complemental to said surfaces.

4. A tool holder comprising a body member having a shank and having an inner face perpendicular to the axis of the shank, a tool clamping member having an inner face parallel to said face and in contact therewith, said clamping member having a shoulder portion with a substantially V-shaped recess therein, the apex of the V extending parallel to the said axis, said clamping member having slots therein on opposite sides of said recess, cylindrical clamping members extending through said slots and into said body member for clamping said tool clamping member thereto, said cylindrical members having diameters within said slots less than the width thereof, a tool clamping plate having a V-shaped tool contacting surface extending into said recess, and means extending through said plate for clamping same to said shoulder portion.

5. A tool holder as claimed in claim 4 in which said cylindrical members have heads with curved inner surfaces, and washers extend around the cylindrical members between the heads thereof and the tool clamping member, the washers having recesses formed complemental to said surfaces therein.

6. A tool holder as claimed in claim 1, in which the inner faces of the body and clamping members are flat, and the means for clamping the body and the tool clamping members together permits movement of the tool clamping member relative the body member in all directions transverse the axis of the shank.

DONALD W. BROOKFIELD.

REFERENCES CITED

The following references are of record in the file of this patent:

UNITED STATES PATENTS

| Number | Name | Date |
|---|---|---|
| 911,999 | Krieger | Feb. 9, 1909 |
| 2,211,596 | Darash | Aug. 13, 1940 |
| 2,347,323 | Jarrell | Apr. 25, 1944 |